Patented Jan. 9, 1923.

1,441,694

UNITED STATES PATENT OFFICE.

KARL P. McELROY, OF WASHINGTON, DISTRICT OF COLUMBIA, ASSIGNOR TO FERRO CHEMICALS INC., OF WASHINGTON, DISTRICT OF COLUMBIA, A CORPORATION OF DELAWARE.

PROCESS OF MAKING FERTILIZERS.

No Drawing. Application filed March 11, 1919, Serial No. 281,947. Renewed May 18, 1922. Serial No. 562,037.

*To all whom it may concern:*

Be it known that I, KARL P. McELROY, a citizen of the United States, residing at Washington, in the District of Columbia, have invented certain new and useful Improvements in Processes of Making Fertilizers, of which the following is a specification.

This invention relates to processes of making fertilizers; and it comprises a method of making a highly concentrated fertilizing material wherein a charge comprising potassium silicates, iron, flux and carbon is submitted to an air blast at a high temperature to produce gas containing fumes and vapors of potassium cyanid and other potassium compounds, said vapors and fumes are condensed and collected and the fumiform material thus condensed and collected is treated with an acid solution to convert the nitrogen into ammonium salts and the potash into a potassium salt, such acid solution advantageously containing phosphoric acid or acid phosphate; all as more fully hereinafter set forth and claimed.

For fertilizer purposes the important materials are of course potash, phosphoric acid and some form of combined nitrogen; a complete fertilizer being one which contains all three. Potash is widely distributed in the rocks but in the usual potassiferous minerals, (feldspar, mica, leucite, glauconite, etc), it is so fixedly held as to be unavailable for agricultural purposes.

In a prior patent, No. 1,156,108, I have, in conjunction with one Arthur C. Spencer, described and claimed a method of producing potassium cyanid wherein potassiferous silicates are used as a raw material; such silicates being charged into a shaft furnace of the type of a blast furnace or a slagging gas producer together with fuel, limestone and iron ore, and exposed to the action of a blast of heated air. Under the circumstances the usual blast furnace or producer reactions take place and in addition the silicates are slagged, releasing their potassium which combines with carbon and with nitrogen from the blast to form cyanid. This cyanid may be recovered in various ways. One such way is to tap off a portion of the gases in the hot zone of the furnace at a point where the cyanid exists as vapor or fume. The rest of the gases go up through the charge in the usual way. On cooling the tapped off hot gases they deposit the cyanid in the solid form. With quick cooling and proper conditions of collection, the deposited material is a gray granular mass rich in cyanid. From it potassium cyanid may be extracted in the usual ways with water or alcohol (60 per cent); or it may be used as it is for many metallurgical purposes.

The described material is not suitable for fertilizer purposes although containing potash and combined nitrogen. It is the purpose of the present invention to convert it into a stable, nonpoisonous and useful fertilizer.

As the material is produced, its character varies materially with circumstances and particularly the circumstances of collection. If the cooling of the hot gases be slow, opportunity for various catalytic and other changes is afforded which may materially reduce the amount of real cyanid in the collected product. As the gases are drawn off from the hot zone, they contain much CO but practically no $CO_2$ or $H_2O$. CO is inert to cyanid but it readily yields $CO_2$ under the catalytic action of iron and of alkalies and $CO_2$ in turn produces $H_2O$ with hydrogen present; and both $CO_2$ and $H_2O$ react with cyanid. Again, in the operation of the furnace metallic potassium may be produced and escape cyanidation, reaching the fumes as carboxid, carbonate, sulfid, etc. The product may at times therefore be a tolerably complex mixture containing in addition to cyanid more or less cyanates, cyanamids, thiocyanids, ferrocyanids, paracyanogen, carbonates, carboxids, etc. It is always more or less contaminated by flying dust from the furnace, containing carbon, iron oxid, silicates, lime, slag, etc. As collected, unless kept dry and out of contact with the air, it is somewhat unstable. Being ordinarily loose and porous in structure, atmospheric moisture penetrates it, setting up complex changes and liberating ammonia.

I have found that all these materials are readily converted into a valuable stable, nonpoisonous fertilizer by simply heating with acid in a closed vessel to prevent extrication of HCN; the acid being used in the amount equal to the basicity of the material as shown by titration in the presence of methyl orange and to the nitrogen, calculated as $NH_3$. This gives a neutral material. Ordinary iron boilers or autoclave may be used. No pressure is necessary although it accelerates the conversion to heat under pressure and at temperatures somewhat above 100° C. Dilute sulfuric acid is a convenient acid. Under the influence of the acid, the various potassium compounds present are all converted into potassium sulfate while the various cyanogen compounds are converted into ammonium sulfate. After digestion with acid, the whole may be simply evaporated to dryness, and the mass, which is a gray white crystalline material, directly marketed as a fertilizer. Or, the liquid may be drained or otherwise separated from insoluble matters and evaporated down in the usual ways to make a purer preparation. Obtained in either way I have a fertilizer containing large percentages of potassium sulfate and of ammonium sulfate and of high value for agricultural purposes.

Instead of using sulfuric acid, I may advantageously employ phosphoric acid or an acid phosphate. In this event I obtain potassium and ammonium phosphates and make a complete fertilizer. Any convenient form of phosphoric acid, such as that made in the electric furnace, or that obtained by treating rock or bone phosphate with the calculated amount of sulfuric acid, may be employed. Solutions of monocalcium phosphate, made by treating calcium phosphate with a smaller amount of sulfuric acid, do very well. Using this material the final products contain some insoluble calcium phosphate but it is in a readily available form.

Other acids, such as hydrochloric (muriatic), may be employed in lieu of sulfuric acid or phosphoric acid, but give products which are less desirable for fertilizer purposes.

Instead of using all the collected fumes for the present purposes, such fume may be preliminarily extracted to recover potassium cyanid and the residue of ferrocyanids, thiocyanates, cyanates, carbonates, etc., digested with acid in the manner described.

In the present method it will be noted potash is recovered in agriculturally available form from potassiferous silicates of no agricultural value, and is accompanied by fixed nitrogen.

A valuable fertilizer material may be obtained by using sodium carbonate in lieu of some or all of the potassiferous silicates in the furnace charge, thereby producing sodium cyanid which on treatment with acid in the manner described gives a material containing ammonia and soda salts. It is not so valuable as the other since it contains no potash, but it is cheaper to produce to the extent of the fuel and flux necessary to slag the potassiferous silicates. Sodium carbonate does not carry silica into the charge and therefore does not give slag.

By using more or less calcium phosphate in the charge, the iron produced is converted into a more fusible and more valuable ferrophosphorus. With rather large amounts of phosphate, more or less phosphorus may go forward with the cyanid. In such an event the fertilizer of the present invention may contain phosphoric acid from this source.

What I claim is:—

1. The process of producing a fertilizer which comprises air blowing a charge of ignited fuel, alkali and iron to produce a fumiform material comprising cyanid condensing said fumiform material and digesting said material with acid.

2. The process of producing a fertilizer which comprises air blowing a charge of ignited fuel, alkali and iron to produce a fumiform material comprising cyanid condensing said fumiform material and digesting said material with phosphoric acid.

3. The process of producing a fertilizer which comprises slagging potassiferous silicates under blast furnace conditions to produce a fumiform material containing potassium cyanid condensing said fumiform material and digesting said material with an acid.

4. The process of producing a fertilizer which comprises slagging potassiferous silicates under blast furnace conditions to produce a fumiform material containing potassium cyanid condensing said fumiform material and digesting said material with phosphoric acid.

In testimony whereof, I affix my signature hereto.

K. P. McELROY.